US012756767B2

(12) United States Patent
Lee

(10) Patent No.: US 12,756,767 B2
(45) Date of Patent: Oct. 6, 2026

(54) NETWORK MANAGEMENT DEVICE AND METHOD

(71) Applicant: HANWHA VISION CO., LTD., Seongnam-si (KR)

(72) Inventor: Jong Ho Lee, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 18/768,414

(22) Filed: Jul. 10, 2024

(65) Prior Publication Data

US 2025/0267202 A1 Aug. 21, 2025

(30) Foreign Application Priority Data

Feb. 16, 2024 (KR) ........................ 10-2024-0022775

(51) Int. Cl.
*H04L 67/60* (2022.01)

(52) U.S. Cl.
CPC .................................... *H04L 67/60* (2022.05)

(58) Field of Classification Search
None
See application file for complete search history.

(56) References Cited

U.S. PATENT DOCUMENTS

| | | | | |
|---|---|---|---|---|
| 11,063,916 | B1 * | 7/2021 | Ferreira | G05B 19/054 |
| 2008/0233983 | A1 * | 9/2008 | Park | H04L 12/2836 455/466 |
| 2018/0351763 | A1 * | 12/2018 | Ock | H04L 12/2825 |

FOREIGN PATENT DOCUMENTS

| | | | | |
|---|---|---|---|---|
| CN | 101282354 A | | 10/2008 | |
| EP | 3 355 521 A1 | | 8/2018 | |
| KR | 10-2011-0096228 A | | 8/2011 | |
| KR | 10-1604983 B1 | | 4/2016 | |
| TW | 201313054 A | * | 3/2013 | H04L 67/34 |

OTHER PUBLICATIONS

Communication issued on Dec. 19, 2024 from the European Patent Office for European Patent Application No. 24188288.5.

* cited by examiner

*Primary Examiner* — Natisha D Cox
(74) *Attorney, Agent, or Firm* — Sughrue Mion, PLLC

(57) ABSTRACT

A network management device including: a first communication interface configured to receive a control command to be transmitted to a destination device among a plurality of service providing devices included in a network; a command manager configured to generate, based on the control command, a dedicated command for the destination device based on the control command being a common command to be transmitted to at least some of the plurality of service providing devices; and a second communication interface configured to transmit the dedicated command to the destination device.

20 Claims, 8 Drawing Sheets

10

FIG. 8

500

| COMMON COMMAND (510) | IDENTIFICATION INFORMATION (520) | DEDICATED COMMAND (530) |
|---|---|---|
| COMMON COMMAND 1 | IDENTIFICATION INFORMATION A | DEDICATED COMMAND 1A |
| | IDENTIFICATION INFORMATION B | - |
| | IDENTIFICATION INFORMATION C | DEDICATED COMMAND 1C |
| | IDENTIFICATION INFORMATION D | DEDICATED COMMAND 1D |
| COMMON COMMAND 2 | IDENTIFICATION INFORMATION A | - |
| | IDENTIFICATION INFORMATION B | DEDICATED COMMAND 2B |
| | IDENTIFICATION INFORMATION C | DEDICATED COMMAND 2C |
| | IDENTIFICATION INFORMATION D | - |
| ⋮ | ⋮ | ⋮ |

FIG. 9

600

610 620

| IDENTIFICATION INFORMATION | DEDICATED COMMAND |
|---|---|
| IDENTIFICATION INFORMATION A | DEDICATED COMMAND Aa |
| | DEDICATED COMMAND Ab |
| | DEDICATED COMMAND Ac |
| | ⋮ |
| IDENTIFICATION INFORMATION B | DEDICATED COMMAND Ba |
| | DEDICATED COMMAND Bb |
| | DEDICATED COMMAND Bc |
| | ⋮ |
| ⋮ | ⋮ |

NETWORK MANAGEMENT DEVICE AND METHOD

CROSS-REFERENCE TO RELATED APPLICATION

This application is based on and claims priority from Korean Patent Application No. 10-2024-0022775 filed on Feb. 16, 2024 in the Korean Intellectual Property Office, the disclosure of which is incorporated herein in its entirety by reference.

BACKGROUND

1. Field

The present disclosure relates to a network management device and method, and more particularly, to a network management device and method for relaying control commands between a service providing device and a user terminal existing on the network.

2. Description of the Related Art

Users may receive services from service providing devices existing on a network. For example, the service providing device may be a camera. The video captured by the camera may be transmitted to a user terminal through the network, and the user may check the scene through the video output from the user terminal.

A plurality of service providing devices may exist on the network. At least some of the plurality of service providing devices may perform different functions. For example, a plurality of service providing devices manufactured by different manufacturers may be included in the network, or service providing devices providing different functions by the same manufacturer may be included in the network.

Since different service providing devices operate by different commands, one device may not able to integrate and manage different service providing devices.

Therefore, there is a need for technology that enables integrated management of different service providing devices.

SUMMARY

Provided is a network management device and method that relays control commands between a service providing device and a user terminal existing on the network.

Additional aspects will be set forth in part in the description which follows and, in part, will be apparent from the description, or may be learned by practice of the presented embodiments.

According to an aspect of the disclosure, a network management device may include: a first communication interface configured to receive a control command to be transmitted to a destination device among a plurality of service providing devices included in a network; a command manager configured to generate, based on the control command, a dedicated command for the destination device based on the control command being a common command to be transmitted to at least some of the plurality of service providing devices; and a second communication interface configured to transmit the dedicated command to the destination device.

The common command may include: a control command for an operation that is performed by the at least some of the plurality of service providing devices, where the dedicated command includes a control command that is not included in the common command.

Based on the control command being the dedicated command for the destination device, the second communication interface may transmit the control command to the destination device.

The command manager may further transmit cache information to a user terminal that transmits the control command.

The network management device may further include a relay interface configured to relay communication between a user terminal that transmits the control command and the destination device.

The relay interface may be further configured to relay the communication between the user terminal and the destination device based on whether the user terminal is authenticated.

The command manager may be further configured to, based on the control command, generate a dedicated command for each of a plurality of destination devices.

Based on a plurality of dedicated commands corresponding to the common command, the command manager may be further configured to generate the plurality of dedicated commands based on the control command.

The common command and the dedicated command may be changed through a cloud service.

The control command may include identification information of the destination device.

According to an aspect of the disclosure, network management method may include: receiving a control command to be transmitted to a destination device among a plurality of service providing devices included in a network; generating, based on the control command, a dedicated command for the destination device based on the control command being a common command for the plurality of service providing devices; and controlling the destination device by transmitting the dedicated command thereto.

The common command may include a control command for an operation that is performed by at least some of the plurality of service providing devices, where the dedicated command includes a control command that is not included in the common command.

The method may further include transmitting the control command to the destination device based on the control command being a dedicated command corresponding to the destination device.

The method may further include: transmitting cache information to a user terminal that transmits the control command.

The method may further include relaying communication between a user terminal that transmits the control command and the destination device.

The relaying the communication between the user terminal and the destination device may be based on whether the user terminal is authenticated.

The method may further include generating, based on the control command, a dedicated command for each of a plurality of destination devices.

The generating the dedicated command for the each of a plurality of destination devices may include generating, based on the control command, a plurality of dedicated commands corresponding to the common command.

The common command and the dedicated command may be changed through a cloud service.

The control command may include identification information of the destination device.

According to an aspect of the disclosure, a network management system may include: a plurality of service providing devices included in a network; a network management device configured to manage the network; and a user terminal configured to transmit a control command to the plurality of service providing devices through the network management device, where the network management device includes one or more processors and a memory storing instructions that, when executed by the one or more processors, cause the network management device to: receive a control command to be transmitted to a destination device among the plurality of service providing devices, generate a dedicated command corresponding to the destination device among the plurality of service providing devices, and control the destination device by transmitting the dedicated command thereto.

The network management device may be further configured to: receive a control command to be transmitted to a plurality of destination devices among the plurality of service providing devices, generate a dedicated command for each of the plurality of destination devices, and control the plurality of destination devices by respectively transmitting the dedicated command to each of the plurality of destination devices.

The control command may include identification of the destination device, where the dedicated command is generated based on the identification information of the destination device.

BRIEF DESCRIPTION OF DRAWINGS

The above and other aspects and features of the present disclosure will become more apparent by describing in detail exemplary embodiments thereof with reference to the attached drawings, in which:

FIG. 8 is a diagram illustrating a common command table according to an embodiment;

FIG. 9 is a diagram illustrating a dedicated command table according to an embodiment.

DETAILED DESCRIPTION

Hereinafter, exemplary embodiments of the present disclosure will be described in detail with reference to the accompanying drawings. Advantages and features of the present disclosure, and a method for achieving the advantages and features will become apparent with reference to the exemplary embodiments described below in detail in conjunction with the accompanying drawings. However, the present disclosure is not limited to the exemplary embodiments below, but may be implemented in a variety of different forms, these exemplary embodiments will be provided only in order to make the present disclosure complete and allow those skilled in the art to completely recognize the scope of the present disclosure, and the present disclosure is only defined by the scope of the claims. The same reference numbers indicate the same components throughout the specification.

Unless defined otherwise, all terms (including technical and scientific terms) used in the present specification have the same meaning as meanings commonly understood by those skilled in the art to which the present disclosure pertains.

It will be understood that the terms "includes," "comprises," "has," "having," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

As used herein, each of the expressions "A or B," "at least one of A and B," "at least one of A or B," "A, B, or C," "at least one of A, B, and C," and "at least one of A, B, or C," may include one or all possible combinations of the items listed together with a corresponding expression among the expressions.

It will be understood that the terms "first", "second", or the like, may be used to distinguish one component from another, and should not be construed to limit the corresponding component in other aspects (e.g., importance or order).

Figure 1:
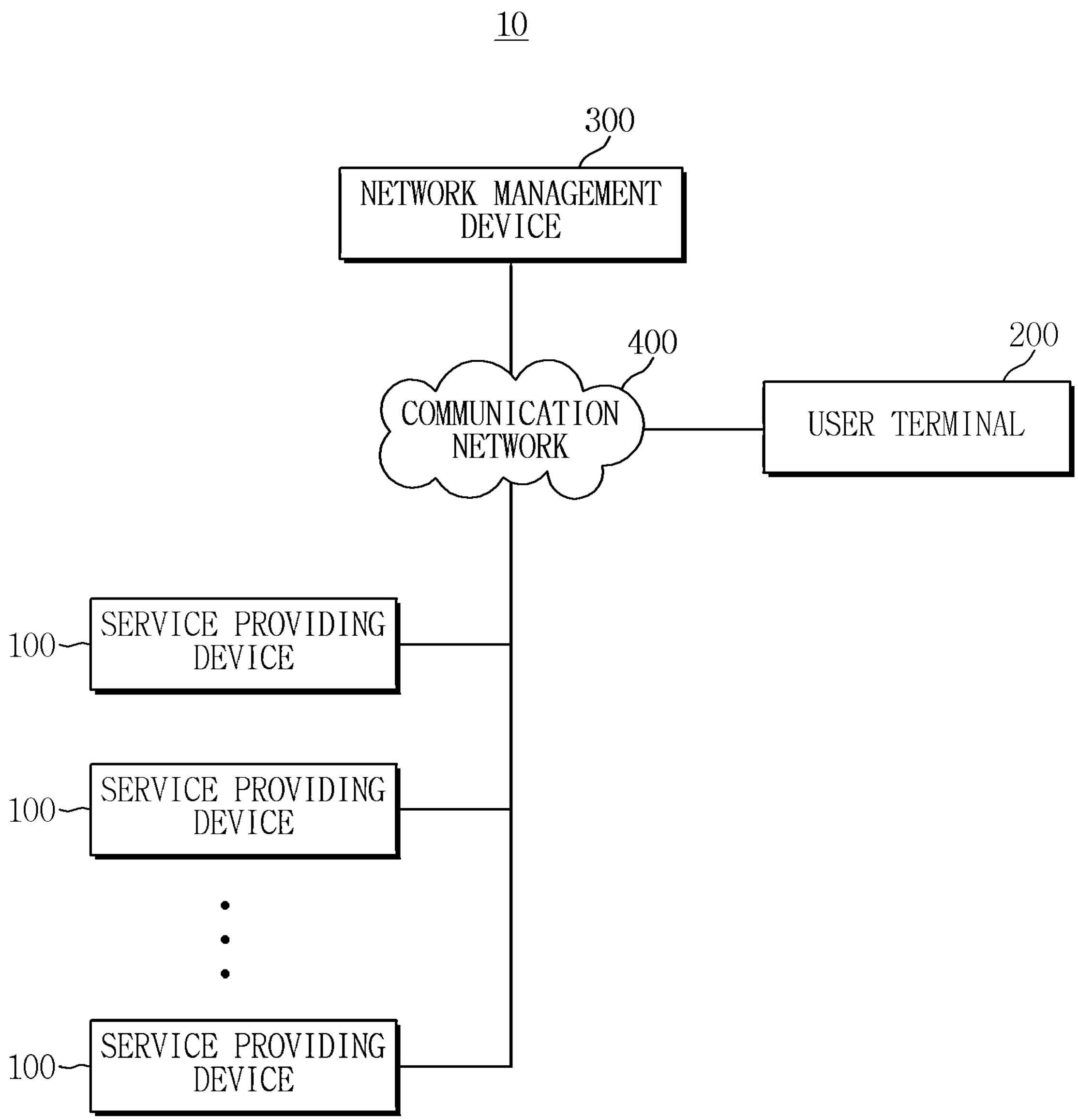
FIG. 1 is a diagram illustrating a network management system according to an embodiment.
Figure 2:
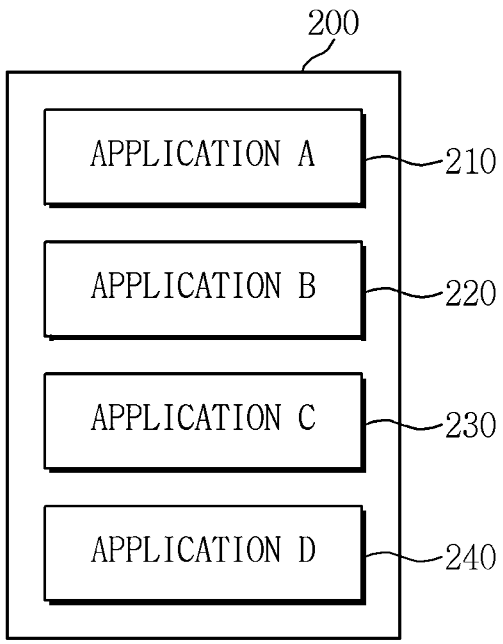
FIG. 2 is a diagram illustrating a user terminal according to an embodiment.

FIG. 1 is a diagram illustrating a network management system, and FIG. 2 is a diagram illustrating a user terminal.

Referring to FIG. 1, a network management system 10 may include a service providing device 100, a user terminal 200, a network management device 300, and a communication network 400.

The service providing device 100 may provide a network service. In the present disclosure, the network service refers to a service that may be provided through a network. For example, the network service may include a video provision service. The service providing device 100 may include at least one of a camera, a network video recorder (NVR), a digital video recorder (DVR), and a management server. The service providing device 100 may provide video generated through capturing or may provide stored video. The management server may transmit the captured or stored video according to an external request. For example, the service providing device 100 may be a video providing system built in an on-premise manner. A plurality of service providing devices 100 operated by the same entity or different entities may provide individual video providing services. The video provided by the service providing device 100 may be a moving image or still image, or both video images and still images.

The user terminal 200 may receive the network service provided by the service providing device 100. For example, the user terminal 200 may receive the video from the service providing device 100.

The network management system 10 may include a plurality of service providing devices 100. The user terminal 200 may receive a service from a service providing device 100 selected from among the plurality of service providing devices 100.

The network management device 300 may relay communication between the service providing device 100 and the user terminal 200. The network management device 300 may relay an exchange of control commands between the service providing device 100 and the user terminal 200.

The user terminal 200 may transmit a control command to receive a service. The network management device 300 may receive the control command from the user terminal 200, identify the service providing device 100 corresponding to the control command, and control an operation by transmitting a service providing command to the corresponding service providing device 100. The service providing command may be generated with reference to the control command and may represent a dedicated command to be described later. The service providing device 100 may be controlled to provide a service corresponding to the service providing command. For example, the service providing device 100 may be controlled to transmit the video to the user terminal 200.

The communication network 400 may provide a communication path between the service providing device 100, the user terminal 200, and the network management device 300. For example, the user terminal 200 may transmit the control command to the network management device 300 through the communication network 400, and the network management device 300 may transmit the service providing command to the service providing device 100 through the communication network 400. In addition, the service providing device 100 may provide a service to the user terminal 200 through the communication network 400.

The network 400 may include a wired network such as local area networks (LANs), wide area networks (WANs), metropolitan area networks (MANs), and integrated service digital networks (ISDNs), etc., a wireless network including wireless Internet such as 3G, 4G (LTE), 5G, Wi-Fi, Wireless Internet such as Wibro, Wimax, etc. a wireless network including short-distance communication and short distance networks, such as Bluetooth, radio frequency identification (RFID), Infrared Data Association (IrDA), Ultra Wideband (UWB), ZigBee, Near field communication (NFC), etc.

FIG. 1 illustrates one communication network 400, but the communication network 400 may include a plurality of partial communication networks that connect the service providing device 100, the user terminal 200, and the network management device 300 to each other.

As described above, the network management system 10 may include the plurality of service providing devices 100. At least some of the plurality of service providing devices 100 may perform different functions. For example, the network management system 10 may include a plurality of service providing devices 100 manufactured by different manufacturers, or may include a plurality of service providing devices 100 that provide different functions by the same manufacturer. Different service providing devices 100 may operate by individually set commands.

Each of the service providing devices 100 and the user terminal 200 may include one or more processors. The one or more processors may include one or more of a central processing unit (CPU), a many integrated core (MIC), a field-programmable gate array (FPGA), a digital signal processor (DSP), a hardware accelerator, etc. The one or more processors may be able to perform control of any one or any combination of the other components or functions of the respective device, and/or perform an operation or data processing relating to communication. The one or more processors execute one or more programs stored in a memory.

Referring to FIG. 2, the user terminal 200 may include a plurality of applications 210, 220, 230, and 240.

The plurality of applications 210 to 240 may be provided to control the operations of the plurality of service providing devices 100. For example, the application A 210 may be provided to control an operation of a service providing device A, and the application B 220 may be provided to control an operation of a service providing device B.

A lot of time and cost may be consumed in producing and maintaining the plurality of applications 210 to 240. The network management device 300 according to an exemplary embodiment of the present disclosure may integrate and manage at least some of the plurality of service providing devices 100. That is, when a preset common command is received from the user terminal 200, the network management device 300 may transmit a dedicated command corresponding to the common command to the service providing device 100 to control the service providing device 100.

In the present disclosure, the common command may include a control command for the same operation that may be performed by at least some of the plurality of service providing devices 100. Among the functions provided in at least some of the service providing devices 100 included in the network management system 10, there may be the same functions regardless of whether the manufacturer or product is the same. For example, at least some of the service providing devices 100 may be switched to an active state to start the operation or switched to an inactive state to stop the operation.

The common command may include a request for a response regarding whether the service providing device 100 is active. At least some of the applications 210 to 240 included in the user terminal 200 may transmit the common command to request a response regarding whether the corresponding service providing device 100 is active. For example, the application A 210 may transmit a common command that includes a request for a response regarding whether the service providing device A is active together with identification information of the service providing device A. In this case, the network management device 300 may transmit a dedicated command for requesting a response regarding whether the service providing device A is active to the service providing device A and transmit the response to the user terminal 200.

The common command may include a user registration command to control the service providing device 100 or a user deregistration command to disable control of the service providing device 100.

The common command may include a license attachment command or a license separation command for use of the service providing device 100. The type or scope of the service provided by the service providing device 100 may be determined according to the license.

The common commands may include a basic information request command for the service providing device 100. Basic information of the service providing device 100 may include a firmware version of equipment included in the service providing device 100, a name of the equipment, and identification information of the equipment. In addition, the common command may include a command requesting a list of equipment included in the service providing device 100, a rebooting command for the equipment, and a firmware upgrade command.

In the present disclosure, the dedicated command may include a control command that is not included in the common commands and represent a control command that may be interpreted by the service providing device 100.

When a new service providing device 100 is included in the network management system 10 or the function of the service providing device 100 is added, the applications 210 to 240 provided in the user terminal 200 may need to be updated. Since the network management device 300 may generate the dedicated command based on the common command, the plurality of service providing devices 100 may be integrated and controlled even if the applications 210 to 240 provided in the user terminal 200 are not updated.

Figure 3:
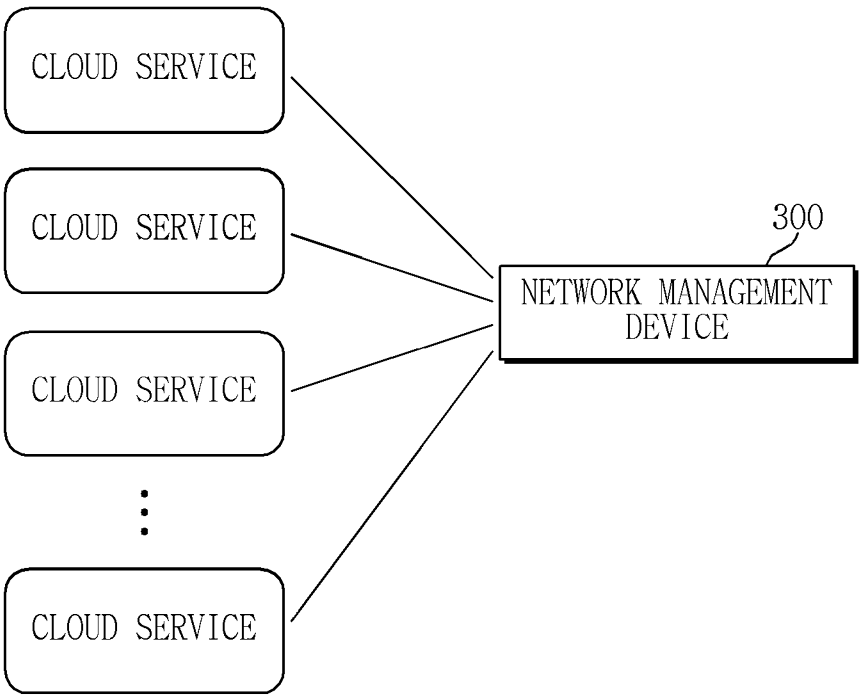
FIG. 3 is a diagram for describing functions of a network management device according to an embodiment.

FIG. 3 is a diagram for describing functions of a network management device.

Referring to FIG. 3, the network management device 300 may provide a cloud service.

A unified service for the plurality of service providing devices 100 may be possible through the cloud service. For example, the same user interface may be provided for the plurality of service providing devices 100 that provide similar functions. Intuitive services for different service providing devices 100 may be provided through the same user interface.

In addition, integrated management of the above-described common command and dedicated command may be performed through the cloud service. For example, the common command and the dedicated command may be added or updated (e.g., changed) through the cloud service. The user may use the integrated and managed common command and dedicated command by modifying the application provided in the user terminal 200 or creating a new application.

There may be a plurality of cloud services provided by the network management device 300. The user may select one of the plurality of cloud services, and the network management device 300 may provide the cloud service selected by the user. For example, when a cloud service that provides video provision service by a specific service providing device 100 is selected, the network management device 300 may provide a user interface that includes a list of cameras included in the service providing device 100 or a list of video captured by each camera. Alternatively, when a cloud service that provides an artificial intelligence analysis service for captured video is selected, the network management device 300 may provide a user interface that includes video reflecting the results of artificial intelligence analysis.

Figure 4:
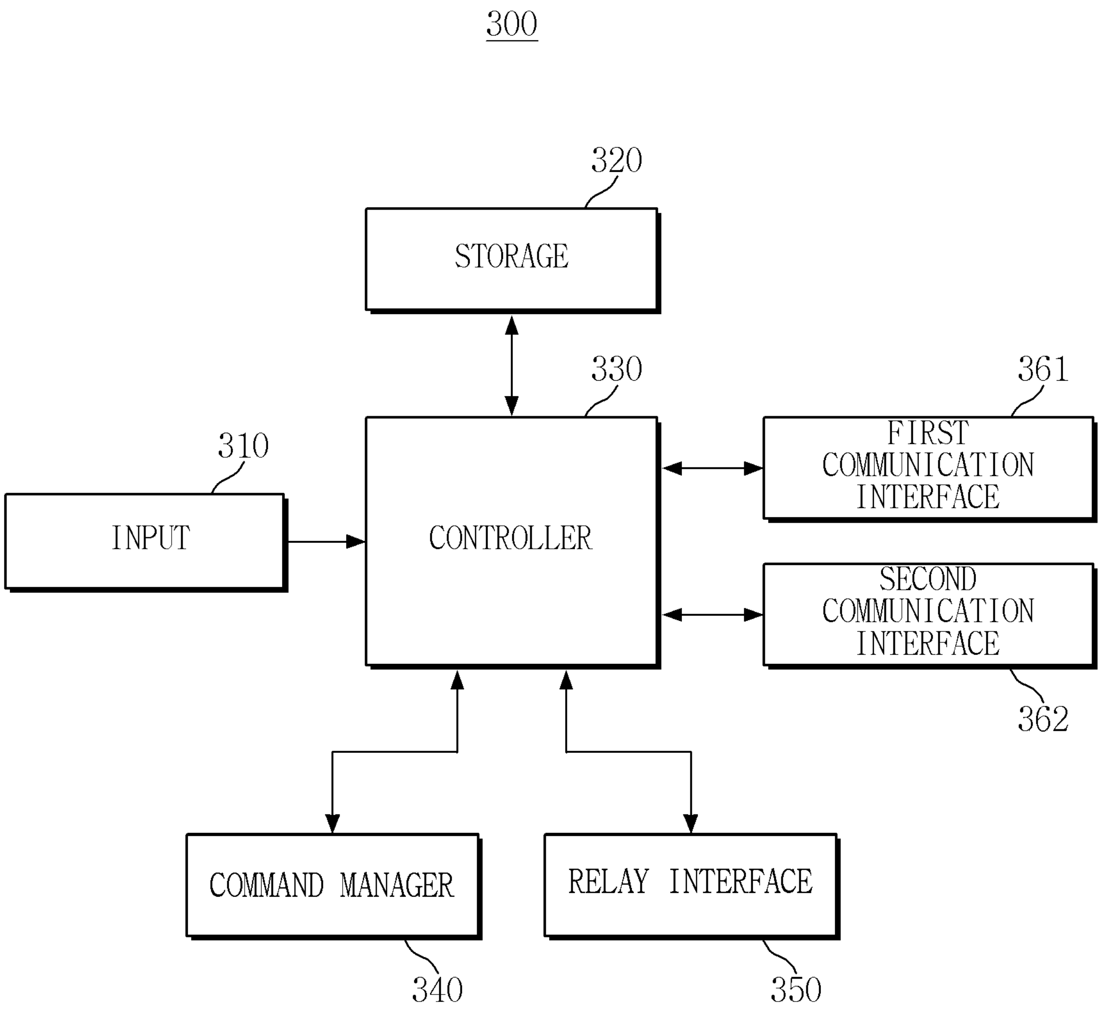
FIG. 4 is a block diagram of the network management device according to an embodiment.

FIG. 4 is a block diagram of the network management device according to an exemplary embodiment of the present disclosure.

Referring to FIG. 4, the network management device 300 according to an exemplary embodiment of the present disclosure includes an input 310, a storage 320, a controller 330, a command manager 340, a relay 350, a first communication interface 361, and a second communication interface 362.

At least some of the components, elements, modules or units represented by a block as illustrated in FIG. 4 may be embodied as various numbers of hardware, software and/or firmware structures that execute respective functions described herein. A network management device 300 according to embodiments of the present disclosure may include one or more processors. The one or more processors may include one or more of a central processing unit (CPU), a many integrated core (MIC), a field-programmable gate array (FPGA), a digital signal processor (DSP), a hardware accelerator, etc. The one or more processors may be able to perform control of any one or any combination of the other components or functions of the network management device represented by FIG. 4, and/or perform an operation or data processing relating to communication. The one or more processors execute one or more programs stored in a memory. The memory may include volatile memory such as a static random access memory (S-RAM) and a dynamic random access memory (D-RAM) for temporarily storing data. In addition, the memory may include a non-volatile memory such as a read only memory (ROM), an erasable programmable read only memory (EPROM), and an electrically erasable programmable read only memory (EEPROM) for long-term storage of data.

The input 310 may receive various data for operation of the network management device 300. For example, the input 310 may receive a common command table 500 (see FIG. 8) and a dedicated command table 600 (see FIG. 9), which will be described later. When the common command table 500 or the dedicated command table 600 is updated, the input 310 may receive the updated common command table 500 or the updated dedicated command table 600.

The storage 320 may temporarily or permanently store various data input through the input 310. For example, the storage 320 may store the common command table 500 and the dedicated command table 600. In addition, the storage 320 may store various cache information about the service providing device 100. For example, the storage 320 may store information such as an active state, a shooting angle, and a storage capacity of the service providing device 100. In addition, the storage 320 may temporarily or permanently store various information necessary for the operation of the network management device 300.

The command manager 340 may process the control command received through the first communication interface 361. When the control command is received, the command manager 340 may first determine whether the control command is a common command for at least some of the plurality of service providing devices 100 included in the network management system 10. Thus, if the control command is a common command, the command manager 340 may generate, based on the control command, a dedicated command for a destination device. Here, the destination device represents the service providing device 100 selected as a destination of the control command among the plurality of service providing devices 100 included in the network management system 10. The user terminal 200 may transmit identification information of the destination device by including the identification information in the control command. The command manager 340 may determine the destination device by referring to the identification information included in the control command, and may, based on the common command, perform control operations by transmitting a dedicated command that may be recognized by the corresponding destination device.

The command manger 340 may determine whether the control command is a common command by referring to the common command table 500 stored in the storage 320, and may generate the dedicated command based on the common command. The common command table 500 will be described in detail later with reference to FIG. 8.

When the received control command is a dedicated command, the command manager 340 may not perform generation of the dedicated command based on the control command. The command manager 340 may determine whether the control command is a dedicated command by referring to the dedicated command table 600 stored in the storage 320. The dedicated command table 600 will be described in detail later with reference to FIG. 9.

The relay interface 350 may relay communication between the user terminal 200 that transmitted the control command and the destination device. For example, the relay interface 350 may perform tunneling between the user terminal 200 and the destination device. The user terminal 200 and the destination device may exchange requests and responses through the relay interface 350.

The relay interface 350 may relay communication between the user terminal 200 and the destination device by referring to whether the user terminal 200 has been authenticated. That is, the relay interface 350 ensures that the tunneling with the destination device is performed only for the authenticated user terminal 200. If authentication of the user terminal 200 fails, the relay interface 350 may block communication between the user terminal 200 and the destination device.

The first communication interface 361 may communicate with the user terminal 200. The first communication interface 361 may receive a control command requested to be transmitted to the destination device among the plurality of service providing devices 100 included in the network from the user terminal 200. In addition, when relaying is performed between the user terminal 200 and the destination device by the relay interface 350, the first communication interface 361 may receive a request from the user terminal 200 and transmit a response received from the destination device to the user terminal 200 in response to the request.

The second communication interface 362 may communicate with the service providing device 100. The second communication interface 362 may transmit a dedicated command to the destination device. When the control command received through the first communication interface 361 is a dedicated command for the destination device, the second communication interface 362 may transmit the control command to the destination device. In addition, when relaying is performed between the user terminal 200 and the destination device by the relay interface 350, the second communication interface 362 may transmit the request received from the user terminal 200 to the destination device and receive a response corresponding to the request from the destination device.

The first communication interface 361 and the second communication interface 362 may each communicate with the user terminal 200 and the service providing device 100 through individual communication channels.

The controller 330 may perform overall control over the input 310, the storage 320, the command manager 340, the relay interface 350, the first communication interface 361, and the second communication interface 362.

Figure 5:
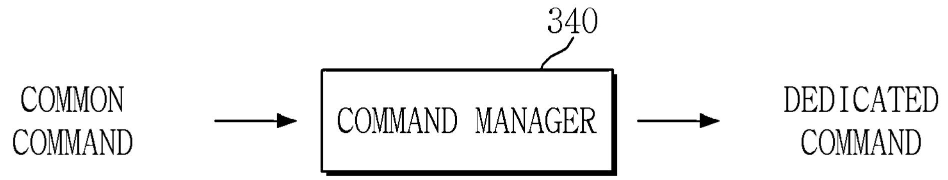
FIG. 5 is a diagram for describing an operation of a command manager when a common command is received according to an embodiment.
Figure 6:
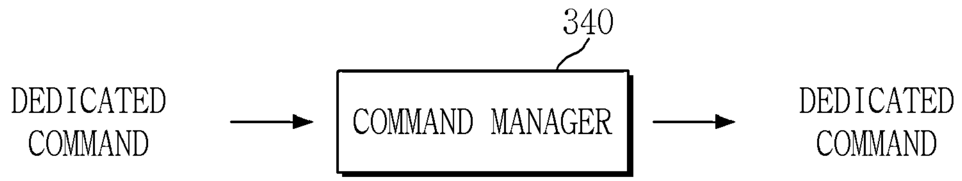
FIG. 6 is a diagram for describing an operation of the command manager when a dedicated command is received according to an embodiment.
Figure 7:
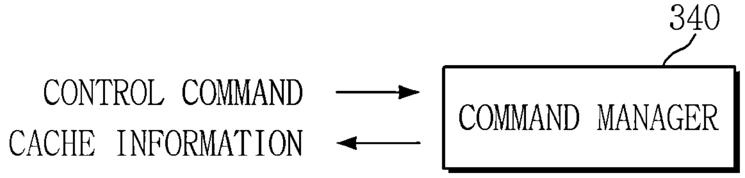
FIG. 7 is a diagram for describing an operation of the command manager when cache information exists according to an embodiment.

FIG. 5 is a diagram for describing an operation of a command manager when a common command is received, FIG. 6 is a diagram for describing an operation of the command manager when a dedicated command is received, and FIG. 7 is a diagram for describing an operation of the command manager when cache information exists.

Referring to FIG. 5, when a common command is received as a control command, the command manager 340 may generate a dedicated command based on the common command.

The common command, which is a command set between the user terminal 200 and the network management device 300, may not be recognized by the service providing device 100. Accordingly, the command manager 340 may generate, based on the common command, a dedicated command that may be recognized by the service providing device 100.

Referring to FIG. 6, when a dedicated command is received as a control command, the command manager 340 may not perform generation of a dedicated command from the control command.

When the user terminal 200 includes a dedicated command that may be recognized by the service providing device 100, the user terminal 200 may transmit the dedicated command as the control command. In this case, the command manager 340 may transmit the corresponding dedicated command to the service providing device 100 through the second communication interface 362 without performing the generation of the dedicated command from the control command.

Referring to FIG. 7, when cache information for the control command exists, the command manager 340 may transmit the cache information to the user terminal 200 that transmitted the control command.

The command manager 340 may determine whether the control command may be responded to by transmitting cache information. Therefore, when the response to the control command is stored in the storage 320 as the cache information, the command manager 340 may extract the corresponding cache information from the storage 320, and transmit the cache information to the user terminal 200 through the first communication interface 361.

Since a response to a request from the user terminal 200 is performed without communication with the service providing device 100, faster service processing is possible and unnecessary waste of network resources may be prevented.

FIG. 8 is a diagram illustrating a common command table.

Referring to FIG. 8, the common command table 500 includes a common command field 510, an identification information field 520, and a dedicated command field 530.

FIG. 8 illustrates a common command table 500 when the network management system 10 includes a service providing device A, a service providing device B, a service providing device C, and a service providing device D.

A common command may be specified in the common command field 510, identification information of the service providing device 100 may be specified in the identification information field 520, and a dedicated command may be specified in the dedicated command field 530.

Identification information of the service providing device 100 to which the common command is applicable may be specified for each common command, and a dedicated command corresponding to the common command may be specified for each identification information of the service providing device 100. Referring to FIG. 8, a dedicated command of the service providing device A for a common command 1 may be 1A, a dedicated command of the service providing device C may be 1C, a dedicated instruction of the service providing device D is 1D, and a dedicated command of the service providing device B may not be set.

When a control command is received through the first communication interface 361, the command manager 340 may determine whether the control command is the common command by referring to the common command table 500. That is, the command manager 340 may check whether the common command corresponding to the received control command is included in the common command table 500. Thus, when the received control command is included in the common command table 500, the command manager 340 may determine that the control command is the common command. In addition, the command manager 340 may check identification information of the service providing device 100 included in the control command and generate a dedicated command corresponding to the identification information from the common command table 500.

The dedicated command generated by the command manager 340 may be transmitted to the service providing device 100 through the second communication interface 362.

When there are a plurality of destination devices, the command manager 340 may generate the dedicated command, based on the control command, for each of the plurality of destination devices. The user terminal 200 may transmit a plurality of control commands to check activation states of the plurality of destination devices. Alternatively, the user terminal 200 may transmit one control command by including a plurality of common commands. The command manager 340 may generate all dedicated commands corresponding to the corresponding control command by referring to the common command table 500. For example, when the common command 1 for the service providing device A and the service providing device D is received, the command manager 340 may generate a dedicated command 1A and a dedicated command 1D from the common command table 500. Since the network management device 300 performs integrated processing of the plurality of common commands, the user terminal 200 may easily receive responses to the plurality of common commands.

In the present disclosure, the common command represents a control command set between the user terminal 200 and the network management device 300. The common command table 500 may be continuously updated by an administrator of the network management device 300, and the user terminal 200 may control a new service providing device 100 without separately updating the applications 210 to 240.

FIG. 8 illustrates that one dedicated command is specified for one identification information, but according to some exemplary embodiments of the present disclosure, a plurality of dedicated commands may also be specified for one identification information. That is, the plurality of dedicated commands may correspond to one common command. When there are a plurality of dedicated commands corresponding to the common command, the command manager 340 may generate a plurality of dedicated commands based on the control command received through the first communication interface 361. For example, the command manager 340 may generate the plurality of dedicated commands by referring to the common command table 500. The plurality of dedicated commands generated by the command manager 340 may be transmitted to the service providing device 100 through the second communication interface 362.

FIG. 9 is a diagram illustrating a dedicated command table.

Referring to FIG. 9, the dedicated command table 600 includes an identification information field 610 and a dedicated command field 620.

Identification information of the service providing device 100 may be specified in the identification information field 610, and a dedicated command may be specified in the dedicated command field 620.

At least one dedicated command may be specified for each identification information of the service providing device 100. Referring to FIG. 9, a dedicated command Aa, a dedicated command Ab, and a dedicated command Ac may be specified for service providing device A.

When the control command received through the first communication interface 361 is not the common command, the command manager 340 may determine whether the corresponding control command is the dedicated command by referring to the dedicated command table 600. That is, the command manager 340 may check whether the dedicated command corresponding to the received control command is included in the dedicated command table 600. Thus, when the received control command is included in the dedicated command table 600, the command manager 340 may determine that the control command is the dedicated command. In addition, the command management manager 340 may check identification information of the service providing device 100 included in the control command and generate a dedicated command corresponding to the identification information from the dedicated command table 600.

The dedicated command generated by the command manager 340 may be transmitted to the service providing device 100 through the second communication interface 362.

Figure 10:
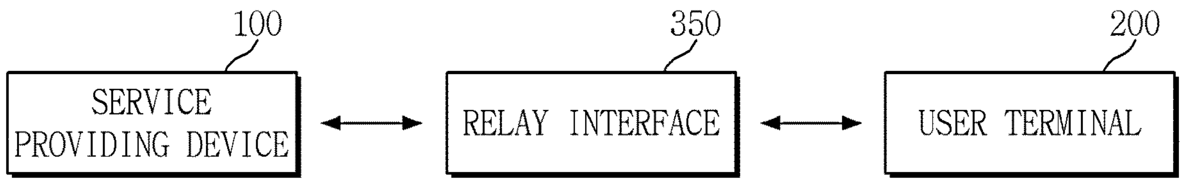
FIG. 10 is a diagram for describing an operation of a relay interface according to an embodiment.

FIG. 10 is a diagram for describing an operation of a relay interface.

Referring to FIG. 10, the relay interface 350 may relay communication between the service providing device 100 and the user terminal 200.

The relay interface 350 may receive a request from the user terminal 200 and transmit the received request to the service providing device 100. In addition, when the service providing device 100 transmits a response to the request, the relay interface 350 may transmit the response to the user terminal 200.

The relay interface 350 may perform a relay operation upon request from the user terminal 200. For example, the user terminal 200 may transmit a control command requesting relaying with the service providing device 100. The user terminal 200 may not secure an address of the service providing device 100. In this case, the user terminal 200 may request relaying with the service providing device 100 to the relay interface 350. Accordingly, the user terminal 200 that has not secured the address of the service providing device 100 may also receive the service of the service providing device 100 through the relay interface 350.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A network management device comprising:

a first communication interface configured to receive a control command to be transmitted to a destination device among a plurality of service providing devices included in a network;

a command manager configured to:

determine whether the control command is a common command to be transmitted to at least some of the plurality of service providing devices or a dedicated command to be transmitted to one service providing device identified as the destination device, and generate, based on the control command, a dedicated command for the destination device based on the control command being the common command to be transmitted to at least some of the plurality of service providing devices; and a second communication interface configured to transmit the dedicated command to the destination device, wherein, based on the control command being the dedicated command to be transmitted to one service providing device, the command manager is configured to not generate the dedicated command for the destination device, and the second communication interface is configured to transmit the control command to the destination device.

2. The network management device of claim 1, wherein the common command comprises a control command for an operation that is performed by the at least some of the plurality of service providing devices, and wherein the dedicated command comprises a control command that is not included in the common command.

3. The network management device of claim 1, wherein the command manager is further configured to transmit cache information to a user terminal that transmits the control command.

4. The network management device of claim 1, further comprising a relay interface configured to relay communication between a user terminal that transmits the control command and the destination device.

5. The network management device of claim 4, wherein the relay interface is further configured to relay the communication between the user terminal and the destination device based on whether the user terminal is authenticated.

6. The network management device of claim 1, wherein the command manager is further configured to, based on the control command, generate a dedicated command for each of a plurality of destination devices.

7. The network management device of claim 1, wherein, based on a plurality of dedicated commands corresponding to the common command, the command manager is further configured to generate the plurality of dedicated commands based on the control command.

8. The network management device of claim 1, wherein the control command comprises identification information of the destination device.

9. A network management method comprising:

receiving a control command to be transmitted to a destination device among a plurality of service providing devices included in a network;

determining whether the control command is a common command to be transmitted to at least some of the plurality of service providing devices or a dedicated command to be transmitted to one service providing device identified as the destination device;

generating, based on the control command, a dedicated command for the destination device based on the control command being the common command to be transmitted to at least some of the plurality of service providing devices; and controlling the destination device by, based on the control command being the common command to be transmitted to at least some of the plurality of service providing devices, transmitting the dedicated command to the destination device, and, based on the control command being the dedicated command to be transmitted to one service providing device, transmitting the control command to the destination device without generating the dedicated command for the destination device.

10. The network management method of claim 9, wherein the common command comprises a control command for an operation that is performed by at least some of the plurality of service providing devices, and wherein the dedicated command comprises a control command that is not included in the common command.

11. The network management method of claim 9, further comprising transmitting cache information to a user terminal that transmits the control command.

12. The network management method of claim 9, further comprising relaying communication between a user terminal that transmits the control command and the destination device.

13. The network management method of claim 12, wherein the relaying the communication between the user terminal and the destination device is based on whether the user terminal is authenticated.

14. The network management method of claim 9, further comprising generating, based on the control command, a dedicated command for each of a plurality of destination devices.

15. The network management method of claim 14, wherein the generating the dedicated command for each of the plurality of destination devices comprises generating, based on the control command, a plurality of dedicated commands corresponding to the common command.

16. The network management method of claim 9, wherein the control command comprises identification information of the destination device.

17. A network management system comprising:

a plurality of service providing devices included in a network;

a network management device configured to manage the network; and a user terminal configured to transmit a control command to the plurality of service providing devices through the network management device, wherein the network management device comprises one or more processors and a memory storing instructions that, when executed by the one or more processors, cause the network management device to:

receive a control command to be transmitted to a destination device among the plurality of service providing devices, determine whether the control command is a common command to be transmitted to at least some of the plurality of service providing devices or a dedicated command to be transmitted to one service providing device identified as the destination device, generate a dedicated command corresponding to the destination device among the plurality of service providing devices, based on the control command being the common command to be transmitted to at least some of the plurality of service providing devices, and control the destination device by, based on the control command being the common command to be transmitted to at least some of the plurality of service providing devices, transmitting the dedicated command to the destination device, and, based on the control command being the dedicated command to be transmitted to one service providing device, transmitting the control command to the destination device without generating the dedicated command for the destination device.

18. The network management system of claim 17, wherein the network management device is further configured to:

receive a control command to be transmitted to a plurality of destination devices among the plurality of service providing devices, generate a dedicated command for each of the plurality of destination devices, and control the plurality of destination devices by respectively transmitting the dedicated command to each of the plurality of destination devices.

19. The network management system of claim 17, wherein the control command comprises identification information of the destination device, and wherein the dedicated command is generated based on the identification information of the destination device.

20. The network management system of claim 17, wherein the control command comprises a command for an operation that is to be performed by the destination device.

* * * * *